Aug. 18, 1970          W. L. KING          3,525,031
VOLTAGE RECTIFIER AND MULTIPLIER
Filed July 26, 1968
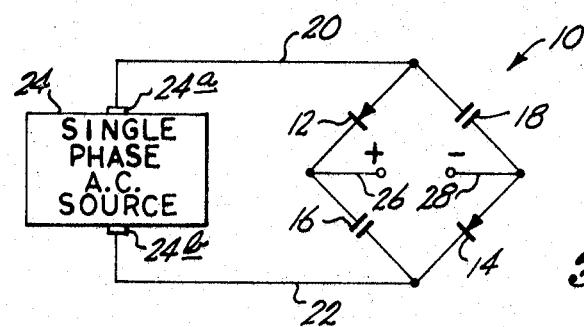
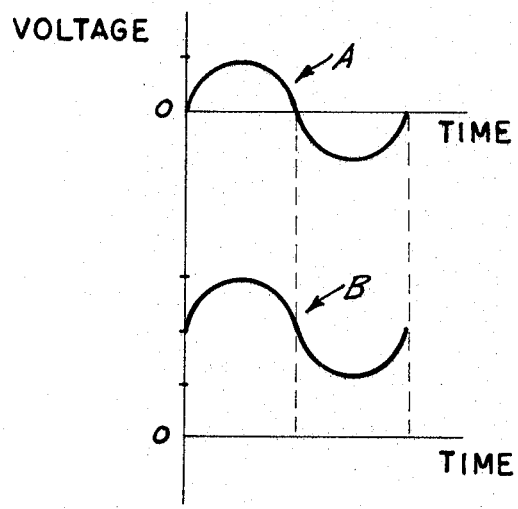
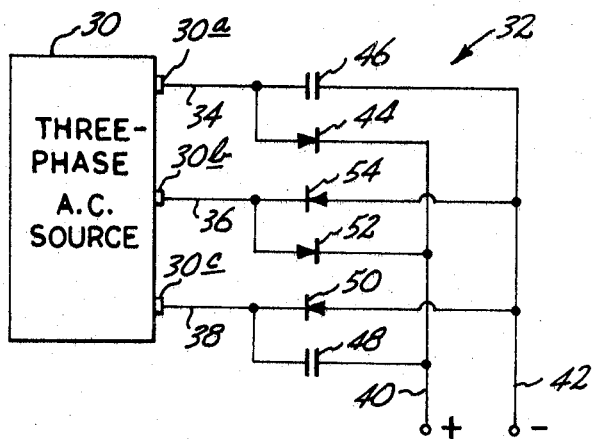
INVENTOR
WILLIAM L. KING
BY
Kolisch + Hartwell
ATTORNEYS United States Patent Office 3,525,031
Patented Aug. 18, 1970

3,525,031
VOLTAGE RECTIFIER AND MULTIPLIER
William L. King, Springfield, Oreg., assignor, by mesne assignments, to Nathan E. Knecht, Springfield, Oreg.
Filed July 26, 1968, Ser. No. 748,093
Int. Cl. H02m 7/00
U.S. Cl. 321—15                    6 Claims

ABSTRACT OF THE DISCLOSURE

A voltage rectifier and multiplier including a pair of AC input terminals and a pair of DC output terminals. The input and output terminals are interconnected by a bridge circuit including two pairs of opposing branches. The branches in one pair each contain a diode, and the branches in the other pair each contain a capacitor. The circuit is adaptable for use in both single-phase and plural-phase applications.

---

This invention pertains to a voltage rectifier and multiplier. More particularly, it pertains to a circuit for producing from an AC voltage having one amplitude, a DC voltage having a greater amplitude.

There are a number of applications where a relatively simple and inexpensive circuit is desired which will produce such action. As an illustration, one might wish to employ such a circuit in conjunction with the alternator in a vehicle, such as a truck, to equip the truck with a ready source of DC power in addition to that provided by the truck's battery. With a truck so equipped, power is available which may be used to operate various types of portable DC equipment that may be carried on the truck. Preferably, such a circuit should be capable of producing a relatively large DC voltage, in order to be capable of handling various types of equipment requiring different operating voltages. In addition, to ensure maximum reliability, the circuit should employ as few components as possible.

A general object of the present invention, therefore, is to provide a novel voltage rectifying and multiplying circuit which offers such features.

According to a preferred embodiment of the invention, the circuit includes a pair of AC input terminals and a pair of DC output terminals. Interconnecting the input and output terminals is a bridge circuit including, in one set of opposing branches a pair of diodes, and in the other set of opposing branches a pair of capacitors. The diodes produce rectification whereby DC voltage only is presented the output terminals. The capacitors become charged during operation of the circuit, and cause the amplitude of the DC voltage produced across the output terminals to be considerably larger than that of the AC voltage applied to the input terminals.

A further object of the invention is to provide a circuit of the type indicated which can readily be connected for use with a source of AC voltage without requiring modification of the source.

Yet another object of the invention is to provide such a circuit which can be employed both in single-phase and in plural-phase applications.

Other objects and advantages attained by the invention will become more fully apparent as the description which follows is read in conjunction with the accompanying drawings, wherein:

FIG. 1 is a schematic diagram of a circuit constructed according to the invention connected for use with a source of single-phase AC voltage;

FIG. 2 illustrates a pair of voltage waveforms, drawn on the same scale, which aid in an understanding of how the circuit of FIG. 1 performs; and FIG. 3 is a schematic diagram of a modified circuit constructed according to the invention connected for use with a source of three-phase AC voltage.

Turning now to the drawings, indicated generally at 10 in FIG. 1, is a voltage rectifier and multiplier circuit constructed according to the invention. The circuit includes a pair of diodes, or rectifiers, 12, 14, and a pair of capacitors, or electrical energy storage devices, 16, 18. The diodes and capacitors are connected in a bridge configuration, with the cathodes of the diodes connected to opposite ends of capacitor 16, and the anodes of the diodes connected to opposite ends of capacitor 18. Diodes 12, 14 occupy one pair of opposing branches in the bridge, and capacitors 16, 18 occupy the other pair of opposing branches.

Also included in the circuit are conductors, or AC input terminals, 20, 22. These conductors are shown connected to a source of single-phase AC voltage indicated in block form at 24. More specifically, conductors 20, 22 are connected to output buses 24a, 24b, respectively, of source 24. Conductor 20 is connected to the junction between diode 12 and capacitor 18, and conductor 22 is connected to the junction between diode 14 and capacitor 16.

At 26, 28 in the circuit are conductors, or DC output terminals. Conductor 26 is connected to the junction between diode 12 and capacitor 16, and conductor 28 is connected to the junction between diode 14 and capacitor 18.

Although no electrical load is shown in FIG. 1, it will be appreciated that various types of DC-operated loads may receive power by being connected to terminals 26, 28.

Explaining now how circuit 10 performs, with an AC voltage such as that indicated at A in FIG. 2 applied through buses 24a, 24b across input terminals 20, 22, a DC voltage wave, such as that indicated at B in FIG. 2, appears across output terminals 26, 28. Diodes 12, 14 function to rectify the AC input voltage, and to ensure that only a DC voltage appears across the output terminals, with terminal 26 positive relative to terminal 28, as indicated by the plus and minus signs. Thus it is noted that voltage wave B is located entirely above the zero-voltage axis, indicating that it represents a DC voltage.

Capacitors 16, 18 function to produce an output voltage wave having a relatively large amplitude. Each capacitor becomes charged to a voltage level which is substantially the same as the amplitude of the applied AC voltage wave. Capacitor 16 becomes charged with its side connected to output terminal 26 positive relative to its other side, and capacitor 18 becomes charged with its side connected to output terminal 28 negative relative to its other side. As a consequence of such charging of capacitors 16 and 18 with the polarities just described, the voltages across them add together, and add to the voltage of source 24. As a result, and as can be seen on comparing voltage waves A and B in FIG. 2, the amplitude of wave B (i.e., its maximum deviation from the zero-voltage axis) is approximately three times as great as the amplitude of wave A.

Turning now to FIG. 3, this illustrates a modified circuit constructed according to the invention connected for use with a source 30 of three-phase AC voltage. For each of its phases, source 30 includes an output bus, and such buses are shown at 30a, 30b, 30c.

The modified circuit is indicated generally at 32, and includes conductors, or AC input terminals, 34, 36, 38, and conductors, or DC output terminals, 40, 42. Input terminals 34, 36, 38 are connected to buses 30a, 30b, 30c, respectively.

Terminal 34 is connected to output terminals 40, 42 through a diode 44 and a capacitor 46, respectively. Terminal 38 is connected to output termials 40, 42 through a capacitor 48 and a diode 50, respectively. Terminal 36 is connected through diodes 52, 54 to output terminals 40, 42, respectively.

Diodes 44, 50, 52, 54 are also referred to herein as rectifiers, and capacitors 46, 48 are also referred to as electrical energy storage devices. Diodes 44, 52 are oriented to permit current to flow therethrough toward output terminal 40. Diodes 50, 54 are oriented to permit current to flow therethrough away from output terminal 42. It will be noted further that diodes 44, 50 and capacitors 46, 48 form a loop, or a bridge circuit interconnecting a pair of the AC input terminals (terminals 34, 38) in the circuit and the DC output terminals.

Circuit 32 performs in much the same manner as previously described circuit 10, with the diodes in the circuit ensuring that only a DC voltage appears across output terminals 40, 42, and the capacitors functioning to increase the amplitude of the output voltage over that of the AC input voltage from source 30. The DC voltage produced across terminals 40, 42 is such that terminal 40 is positive relative to terminal 42, as indicated. The amplitude of such voltage is about three times as great as the amplitude of the voltage produced by source 30.

Thus, the invention provides a novel circuit for producing from an AC voltage having one amplitude, a DC voltage having a considerably greater amplitude. The circuit is relatively simple in construction, and employs a minimum number to components. It is both reliable, and lends itself to economical manufacture.

In addition, the circuit can easily be connected to various types of AC sources without requiring modification of such sources.

Still another advantage is that the circuit can be produced in relatively compact form.

An important feature of the invention is that it is readily adaptable for use with both single-phase and plural-phase sources. And while a modification of the invention is described herein in conjunction with a three-phase source, it will be appreciated by those skilled in that art that other modifications are possible which will enable the invention to be used with other types of plural-phase sources.

While a preferred embodiment and a modification of the invention have been described herein, it is appreciated that other variations and modifications may be made without departing from the spirit of the invention. Accordingly, it is desired to cover all such variations and modifications which would be apparent to one skilled in the art.

It is claimed and desired to secure by Letters Patent:

1. For use with a source of plural-phase AC voltage having one amplitude, said source including an output bus for each phase,
  a circuit for producing from such AC voltage a DC voltage having a greater amplitude comprising
  an AC input terminal for each bus, adapted to be connected to the bus,
  a pair of DC output terminals,
  and means operatively interconnecting said input terminals and said output terminals including
  a pair of rectifiers, once operatively interconnecting one input terminal and one output terminal and oriented to permit current to flow therethrough toward said one output terminal, and the other operatively interconnecting another input terminal and the other output terminal and oriented to permit current to flow therethrough away from said other output terminal,
  and a pair of electrical energy storage devices, one having one of its sides connected to said one input terminal and its other side connected to said other output terminal, and the other having one of its sides connected to said other input terminal and its other side connected to said one output terminal,
  said rectifiers and said storage devices forming a closed loop in said circuit.

2. The circuit of claim 1, wherein each of said electrical energy storage devices comprises a capacitor.

3. The circuit of claim 2, wherein each of said rectifiers comprises a diode.

4. For use with a source of three-phase AC voltage having one amplitude, said source including an output bus for each phase,
  a circuit for producing from such AC voltage a DC voltage having a greater amplitude comprising
  first, second and third AC input terminals, each adapted to be connected to a different bus,
  a pair of DC output terminals,
  a first pair of rectifiers, one operatively interconnecting said first input terminal and one of said output terminals and the other operatively interconnecting said first input terminal and the other output terminal, said one rectifier being oriented to permit current to flow therethrough toward said one output terminal, and the other rectifier being oriented to permit current to flow therethrough away from said other output terminal,
  a second pair of rectifiers, one operatively interconnecting said second input terminal and said one output terminal and oriented to permit current to flow therethrough toward said one output terminal, and the other operatively interconnecting said third input and said other output terminal and oriented to permit current to flow therethrough away from said other output terminal,
  and a pair of electrical energy storage devices, one operatively interposed between said second input terminal and said other output terminal, and the other operatively interposed between said third input terminal and said one output terminal,
  the rectifiers of said second pair of rectifiers and said storage devices forming a closed loop in said circuit.

5. The circuit of claim 4, wherein each of said electrical energy storage devices comprises a capacitor.

6. The circuit of claim 5, wherein each of said rectifiers comprises a diode.

References Cited

UNITED STATES PATENTS 3,121,835   2/1964   Diebold _____ 321—15

FOREIGN PATENTS 134,301   7/1933   Germany.
690,424   6/1930   France.

W. M. SHOOP, JR., Primary Examiner.

U.S. Cl. X.R.

321—47